United States Patent
Mattheis

(10) Patent No.: US 8,387,943 B1
(45) Date of Patent: Mar. 5, 2013

(54) PINCH VALVE

(76) Inventor: Harley H. Mattheis, Verona, NJ (US)

( * ) Notice: Subject to any disclaimer, the term of this patent is extended or adjusted under 35 U.S.C. 154(b) by 494 days.

(21) Appl. No.: 12/653,048

(22) Filed: Dec. 8, 2009

Related U.S. Application Data

(63) Continuation-in-part of application No. 11/652,976, filed on Jan. 11, 2007, now abandoned.

(51) Int. Cl.
F16K 7/04 (2006.01)
(52) U.S. Cl. .................. 251/7; 251/4
(58) Field of Classification Search ............ 251/4–10; 222/92, 93, 95, 101, 102
See application file for complete search history.

(56) References Cited

U.S. PATENT DOCUMENTS

| | | | |
|---|---|---|---|
| 48,421 A | 6/1865 | Matthews, Jr. | |
| 307,871 A | 11/1884 | Richtmann | |
| 453,628 A | 6/1891 | Durand | |
| 820,216 A | 5/1906 | Leffingwell et al. | |
| 1,238,521 A | 8/1917 | Janish, Jr. | |
| 2,471,623 A | 5/1949 | Hubbell | |
| 3,262,670 A | 7/1966 | Russell | |
| 3,497,175 A * | 2/1970 | Koland | 251/9 |
| 3,675,656 A * | 7/1972 | Hakim | 606/158 |
| 3,793,785 A | 2/1974 | Austin | |
| 3,866,611 A | 2/1975 | Baumrucker | |
| 3,984,080 A * | 10/1976 | Varis et al. | 251/5 |
| 4,029,441 A | 6/1977 | Fischer | |
| 4,066,238 A * | 1/1978 | Clarke | 251/6 |
| 4,071,039 A | 1/1978 | Goof | |
| 4,235,412 A | 11/1980 | Rath et al. | |
| 4,346,869 A | 8/1982 | MacNeill | |
| 4,582,292 A | 4/1986 | Glotzback | |
| 4,624,663 A * | 11/1986 | Danby et al. | 604/250 |
| 4,634,092 A | 1/1987 | Daniell et al. | |
| 4,667,924 A * | 5/1987 | Speidel | 251/9 |
| 4,688,753 A | 8/1987 | Tseng et al. | |
| 4,717,047 A * | 1/1988 | van Overbruggen et al. | 222/207 |
| 4,895,341 A | 1/1990 | Brown et al. | |
| 4,960,259 A | 10/1990 | Sunnanvader et al. | |
| 5,088,522 A | 2/1992 | Rath et al. | |
| 5,139,018 A * | 8/1992 | Brodsky et al. | 128/207.14 |
| 5,254,083 A * | 10/1993 | Gentelia et al. | 604/35 |
| D389,228 S * | 1/1998 | Winterer et al. | D23/245 |
| 6,036,166 A | 3/2000 | Olson | |
| 6,536,738 B2 | 3/2003 | Inoue et al. | |
| 6,554,589 B2 | 4/2003 | Grapes | |
| 6,702,827 B1 | 3/2004 | Lund et al. | |
| 6,840,492 B1 | 1/2005 | Boyne-Aitken | |
| 6,883,773 B1 | 4/2005 | Mattheis | |
| 6,948,696 B1 | 9/2005 | Aanonsen et al. | |
| 7,140,509 B2 | 11/2006 | Yang | |
| 7,255,321 B2 | 8/2007 | Tomioka et al. | |
| 7,367,358 B2 | 5/2008 | Malcolm | |
| 2006/0049371 A1 | 3/2006 | Ohnishi | |
| 2007/0125810 A1 | 6/2007 | Blum et al. | |

* cited by examiner

Primary Examiner — John K Fristoe, Jr.
Assistant Examiner — Marina Tietjen
(74) Attorney, Agent, or Firm — Siegmar Silber, Esq.

(57) ABSTRACT

A pinch valve for controlling fluid flow through flexible tubing is disclosed. The valve has a frame for accommodating flexible tubing and a tube-constricting arrangement, which arrangement includes a pair of arc sections on one side of the frame forming a throat or crimping channel transverse to the tube axis and a blade member extending correspondingly and transversely on the other side. An actuator reciprocally positions the blade member between an open and closed position. When the blade member is in the closed position, flexible tubing is crimped within the throat, preventing fluid flow therethrough. When the blade member is moved away from the tubing in an open position, the flexible tubing reverts to a relaxed condition and allows fluid flow therethrough. The pinch valve is utilizable with a bladder that provides a closed system and assists in throttling the flow of the fluid.

20 Claims, 7 Drawing Sheets

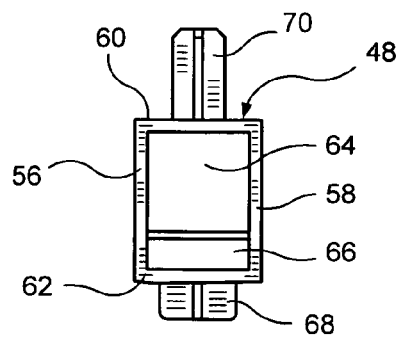 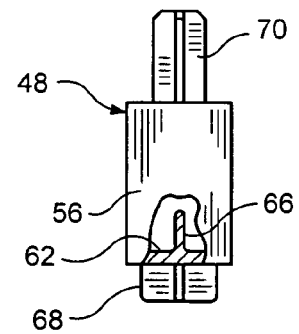
FIG. 4  FIG. 5
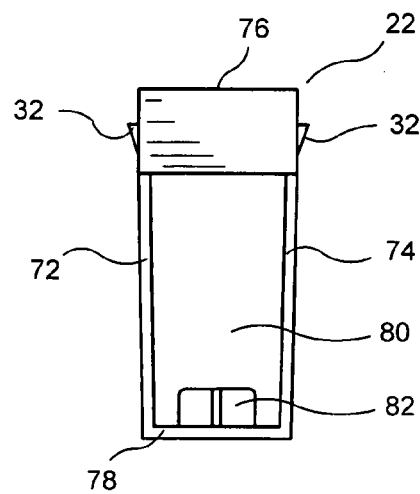 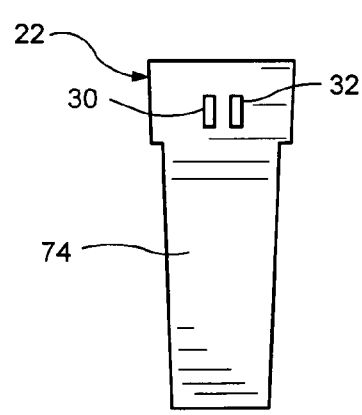
FIG. 6  FIG. 7

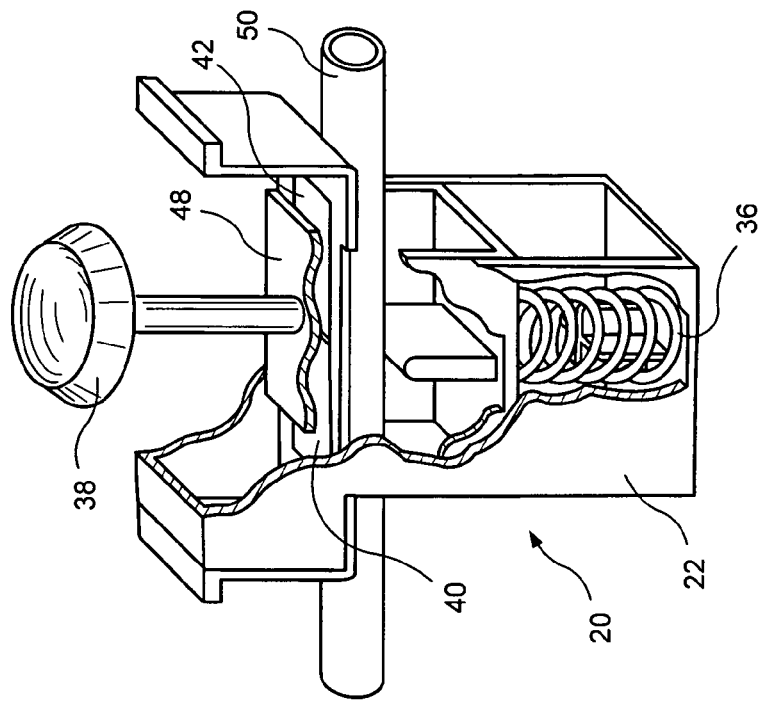
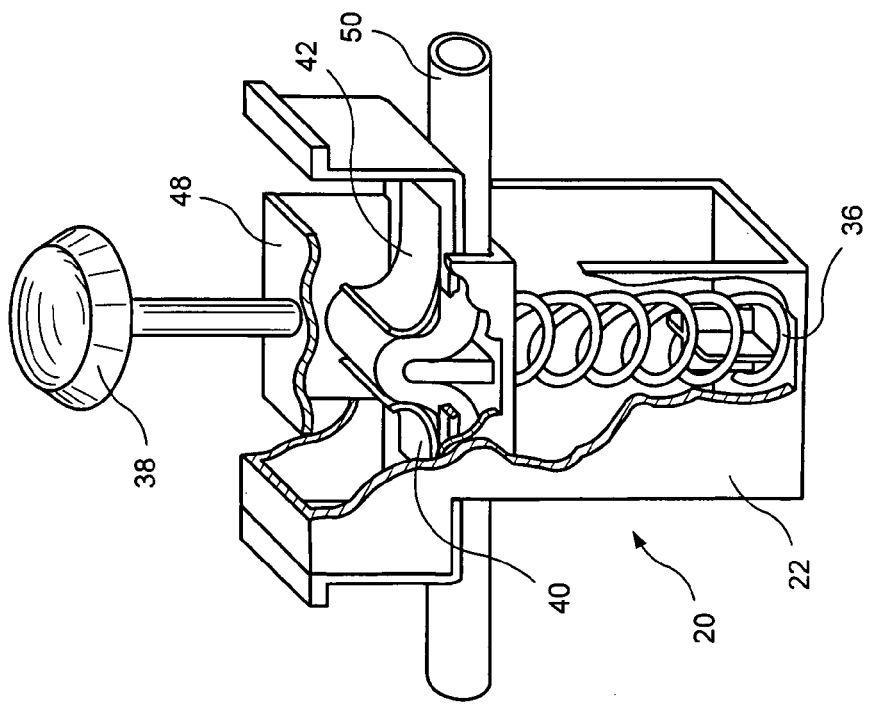

PINCH VALVE

CROSS-REFERENCE TO RELATED APPLICATION

This is a Continuation-in-Part of an application entitled PINCH VALVE filed Jan. 11, 2007, now abandoned Ser. No. 11/652,976, which is incorporated herein by reference.

BACKGROUND OF THE INVENTION

1. Field of the Invention

This invention relates to a manually-operated pinch or crimp valve for regulating the flow of a fluid through flexible tubing. More particularly, the valve operator is a two-position device that requires low actuator pressure for stopping or initiating fluid flow, which characteristic is especially useful for handling fluids stored under high pressure.

2. Description of Prior Art

Pinch valves are generally provided to a continuous duct, tube, or other flexible conduit or line to control the flow of fluid through that line. Such valves control or terminate fluid flow by constricting or pinching the line, thus maintaining fluid under pressure within the line and upstream of the valve. While a number of different types of pinch valve designs are known, many of the existing pinch valves in use are either complicated in design and construction with too many component parts or are inefficient in actually maintaining a closed condition. Frequently, prior art pinch valves, when closed, allow leakage past the valve.

Pinch valves have many applications in industry, and a wide variety of valves have been developed to serve different industrial requirements. For some demanding applications requiring high flow rates, high pressures, high temperatures, no contamination, corrosive materials handling or precision metering, such as semiconductor processing, precision instruments, medical, pharmaceuticals, chemical, food processing or the like, existing pinch valve designs are not fully satisfactory.

The limitations of existing pinch valve designs include factors such as: construction materials such as plastics, elastomers, and metals; sliding surfaces which lead to wear, cleaning and sanitation difficulties; and, complex geometry also having accompanying cleaning and sterilization difficulties. Size, and cost limitations are other complicating factors in pinch valve design.

In the past, numerous pinch valve designs have been suggested and such designs have been generically categorized by the nature of the tube compression encountered—whether by roller tube or by perpendicularly reciprocated tube contacting element (a blade) and also by how the blade is operated. Operating schemes have included springs, levers, and screw actuators.

The inventor hereof is also the inventor of U.S. Pat. No. 6,883,773 issued Apr. 26, 2005, which patent describes a pinch valve controlling fluid through flexible tubing. In this valve, an actuator, upon the application of pressure, overcomes the spring bias causing the pinch element to move away from the collapsed flexible tubing and initiate fluid flow therethrough. While this valve was adequate at low fluid pressure, at higher fluid pressures, it was ascertained that the manual pressure at the actuator was unacceptable.

Through the prior patent the inventor hereof became familiar with the following patents, all of which are original classification 251/7 or cross-referenced thereinto:

| patent | Inventor | Issue Date |
| --- | --- | --- |
| 48,421 | Matthews, Jr. | June 1865 |
| 307,871 | Richtmann | November 1884 |
| 2,471,623 | Hubbell | May 1949 |
| 3,262,670 | Russell | July 1966 |
| 4,634,092 | Daniell et al. | January 1987 |
| 6,536,738 | Inoue et al. | March 2003 |

In the course of preparation, for the within disclosure several patents and published applications became known to the inventor hereof. The following patents are believed to be relevant and are discussed further as to the significance thereof:

| U.S. patents | | |
| --- | --- | --- |
| patent | Inventor | Issue Date |
| 4,029,441 | Fischer, L. | Jun. 14, 1977 |
| 4,071,039 | Goof, S. K. L. | Jan. 31, 1978 |
| 4,688,753 | Tseng, et al. | Aug. 25, 1987 |
| 4,895,341 | Brown et al. | Jan. 23, 1990 |
| 4,960,259 | Sunnanväder et al. | Oct. 2, 1990 |
| 5,088,522 | Rath et al. | Feb. 18, 1992 |
| 6,036,166 | Olson, D.L. | Mar. 14, 2000 |
| 6,536,738 | Inoue et al. | Mar. 25, 2003 |
| 6,554,589 | Grapes | Apr. 29, 2003 |
| 6,840,492 | Boyne-Aitken | Jan. 11, 2005 |
| 6,883,773 | Mattheis | Apr. 26, 2005 |
| 6,948,696 | Aanonsen et al. | Sep. 27, 2005 |

| U.S. PATENT APPLICATION PUBLICATIONS | | |
| --- | --- | --- |
| 2005/0258382 | Yang | Nov. 24, 2005 |
| 2006/0049371 | Ohnishi | Mar. 9, 2006 |
| 2006/0138369 | Tomioka et al. | Jun. 29, 2006 |

Several of the above patents have plungers acting upon flexible tubing in various configurations. Goof '039 uses fluid pressure within a control assembly to regulate plunger position and fluid flow. Tseng et al. '753 drives a wedge-shaped tongue member to force the tubing onto a tubing occluding surface, which surface conforms the original bottom half of the tubing. Grapes '589 has a tube tunnel in which to dispose the flexible tubing and lowers a plunger thereagainst. The plunger has a spherical tube contacting end dimensioned to fit the exterior of the tube. None of these operate into a throat of diminishing size. In systems operating under high pressure, such arrangements are not suitable for manual actuation.

In addition to plungers, various means for protecting the flexible tubing that is pinched to cut off fluid flow. Rath et al. '522 teaches a pump hose with arcuate portions to minimize stress at the hose joints. Brown et al. '341, Sunnanväder et al. '259, and Inoue et al. '738 show sleeve-like casings surrounding the flexible tubing for purposes of avoiding injurious activities in operation.

The published patent application to Yang shows a suction hose stop valve having a holder through a central passageway and a swivel cap. Here, when the hose is in the open condition, closure is accomplished by swivelling the cap to fold the hose upon itself. Thereafter the swivel cap is latched to maintain the closed position.

Boyne-Aitken '292 patent is representative of a wide variety of tube clamps and clips typically used for intravenous drips or similar fluid delivery. This patent describes two flexible curved beams forming a threshold to the pinch zone of the clamp. These beams act as a stop or retainer preventing free movement between the open segment and the closed segment of the tube clamp and do not have any pinching function once the clamp is open or closed.

Prior art pinch valves also teach the use of flexible tubing inserts. The pinch valve of Aanonsen et al. '696 has a resiliently flexible valve member which is folded upon itself. A valve operator selectively exerts a lateral force upon the valve member to unfold the insert and operate the valve.

The Ohnishi published patent application utilizes various projections on the inner wall of the flexible tubing to ensure complete closure when pressure is applied to the outside of the tubing. The patterned projections also enable control of microflow through the system.

The present invention provides a novel pinch valve for use with liquids under high pressure. The use of the blade member to force tubing between arc or arc-like segments provides a mechanical advantage over the prior art pinch valves. The use of the arc or arc-like segments, along with its corresponding flexible movement, to open or close the pinch valve and to allow for the flow of the liquids, requires lower hand pressure and less spring action. The arc or arc-like segments overcome the high friction that results from bending the flexible tubing. Such novel design allows for the containment of high pressure liquids when in a closed position, with the ability to open the pinch valve by solely using hand pressure.

While it is difficult to provide a pinch valve design that satisfies all the requirements of industry, there is a need for a normally closed valve or a normally open valve with improved features for demanding applications. For example, it is desirable for such a valve to provide complete shutoff at high pressures and require drgonomically suitable manual operating characteristics.

SUMMARY OF THE INVENTION

The present invention describes a pinch valve for the purpose of constricting and releasing the flow of fluid through flexible tubing. The pinch valve is composed of a frame adapted to surround the flexible tubing, a pair of tube-constricting members or arc segments on one side of the interior of the frame, a blade member extending transversely on the other side of the interior of the frame, and an actuator for manually activating the pinch valve. The flexible tubing is threaded between the tube-constricting members and the blade member.

The pair of tube-constricting members is operable between a relaxed condition and a flexed condition. When it is in the flexed condition, a channel is formed that is transverse to the longitudinal axis of the flexible tubing.

The blade member is reciprocally positionable between an open position and a closed position. When the blade member is in the closed position, the tube-constricting members are in a flexed position, and the flexible tubing is crimped within the transverse channel, thereby preventing fluid flow therethrough. With the actuator depressed and the blade member in the open position, the tube-constricting members revert to a relaxed condition, allowing fluid flow through the flexible tubing. The pinch valve is constructed so that the manual force required for operation of the actuator is, even at high flow pressures, within the ergonomic range.

An alternative embodiment of the pinch valve is composed of a base, an open framework arising from the base having a front, a back, a right- and a left side adapted for threading the flexible tubing through the medial portion of the framework, a blade member disposed between the base and the flexible tubing, a manual actuator, and a restrictive channel having a wide mouth and a narrow throat disposed in the open framework on the actuator side of the flexible tubing.

As in the first embodiment, the blade member is reciprocally positionable between an open position and a closed position. When the blade member is in the closed position, it crimps the flexible tubing into a narrowed throat or restrictive channel, thereby preventing fluid flow through the tubing. When the actuator is depressed, the blade member assumes an open position, the restrictive channel releases the flexible tubing to an uncrimped position, and fluid flow is permitted through the flexible tubing.

A third embodiment includes the flexible tubing as part of the pinch valve. It also includes a valve body with an opening for the insertion of the flexible tubing, a pinch arm attached to the body and engageable to one side of the flexible tubing passing through the opening, an actuator and a restrictive throat on the valve body on the actuator side of the flexible tubing. A fourth embodiment includes the flexible tubing and a bladder as part of the pinch valve. The bladder is configured to store fluid when the pinch arm is in the closed position.

The pinch arm is movable between an open position at which the flexible tubing is not compressed, and a closed position at which the flexible tubing is collapsed due to compression by the pinch arm. The restrictive throat is oriented to accommodate, when the pinch arm is in a closed position, the pinch arm and the flexible tubing in a collapsed condition.

OBJECTS AND FEATURES OF THE INVENTION

It is thus an object of the present invention to provide an easy to control pinch valve serving a high-pressure fluid source requiring minimal manual pressure to operate.

It is another object of the present invention to provide a normally closed valve which is simple in construction and readily assembled.

It is a further object of the present invention to provide a pinch valve permitting fluid flow therethrough only when the actuator is depressed.

It is yet a further object of the present invention to provide a pinch valve which is easy to install and to incorporate into a flow control system.

It is another object of the present invention to provide a pinch valve which is simultaneously operable with multiple tubes.

It is a feature of the present invention to utilize, in a hybrid construction, arc segments and a transverse blade as constricting elements for mechanically efficient valve operation.

It is a further feature of the present invention that the system operates as a closed system ensuring an anti-contamination environment.

It is another feature of the present invention to have the spring biasing means perform dual functions of urging a blade contacting element into the flexible tubing and forming arcuate contacting elements for cooperative functioning therewith.

It is yet a further feature of the present invention to maintain the manual pressure required for operation in a normal ergonomic range.

Novel features which are considered as characteristic of the invention are set forth in particular in the attendant claims. The invention, itself, however both as to its design, construction and use, together with the additional features and advantages thereof, are best understood upon review of the following detailed description with reference to the accompanying drawings.

BRIEF DESCRIPTION OF THE DRAWINGS

The drawing shows the pinch valve of this disclosure in which similar parts in the various views have the same reference designators.

FIG. 4 is a front view of the transverse pinch member of the pinch valve of this invention;

FIG. 5 is a side elevational view of the transverse pinch member shown in FIG. 4 with the side wall thereof partially broken away to show the transverse blade;

FIG. 6 is a front view of the outer housing of the pinch valve of this invention;

FIG. 7 is a side elevational view of the outer housing shown in FIG. 6;

FIG. 12 is a cutaway perspective view showing the pinch valve of this invention in the normally closed condition;

FIG. 13 is a cutaway perspective view showing the pinch valve of this invention operated to the open condition;

DESCRIPTION OF THE PREFERRED EMBODIMENTS

Figure 1:
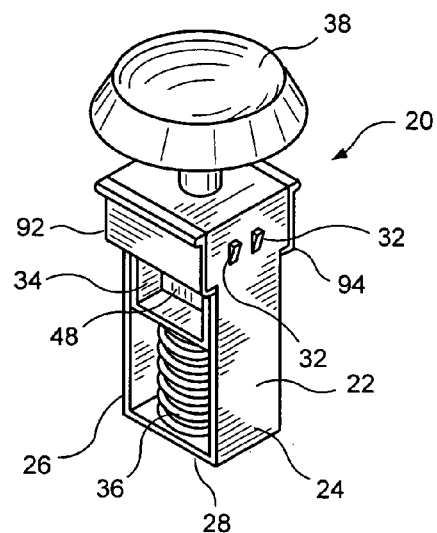
FIG. 1 is a perspective view of the pinch valve of this invention.

Referring now to FIG. 1, a pinch valve of the present invention is shown and is referred to generally by the reference designator 20. The pinch valve 20 is constructed with an outer housing 22 with side walls 24 and 26 and a base 28. The side walls 24 and 26 each have mounting and locking tabs 30 and 32 which are used to secure the pinch valve 20 into a panel (not shown). The outer housing or valve body 22 of pinch valve 20 is further constructed with an aperture or opening 34 therethrough, which aperture 34 is provided to accommodate one or more flexible tubings for the conduct of fluid flow. The pinch valve 20 of this invention is a normally closed valve and is maintained in such condition by the spring or biasing means 36. The force of the biasing means 36 is overcome by the manual operation of the actuator or pushbutton 38.

Figure 2:
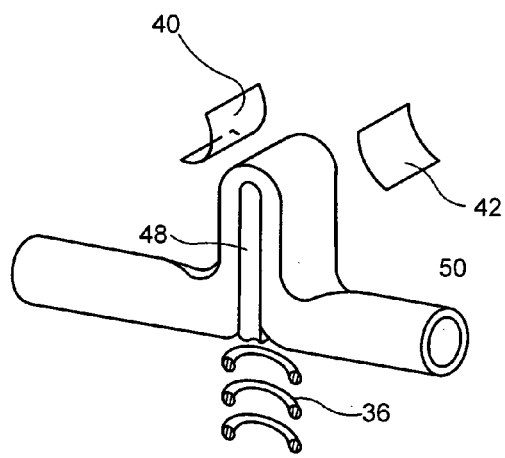
FIG. 2 is a schematic view of the pinch valve of FIG. 1 showing the arc segments and the relation thereof to the crimped flexible tubing.
Figure 3:
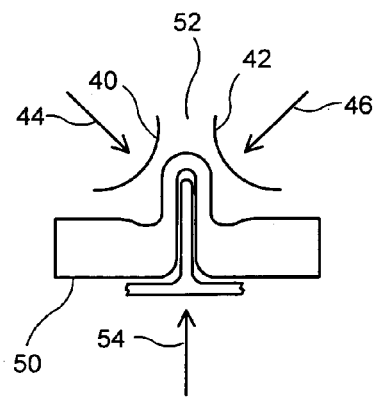
FIG. 3 is a schematic view of the pinch valve of FIG. 1 showing the force vectors acting on the flexible tubing.
Figure 11:
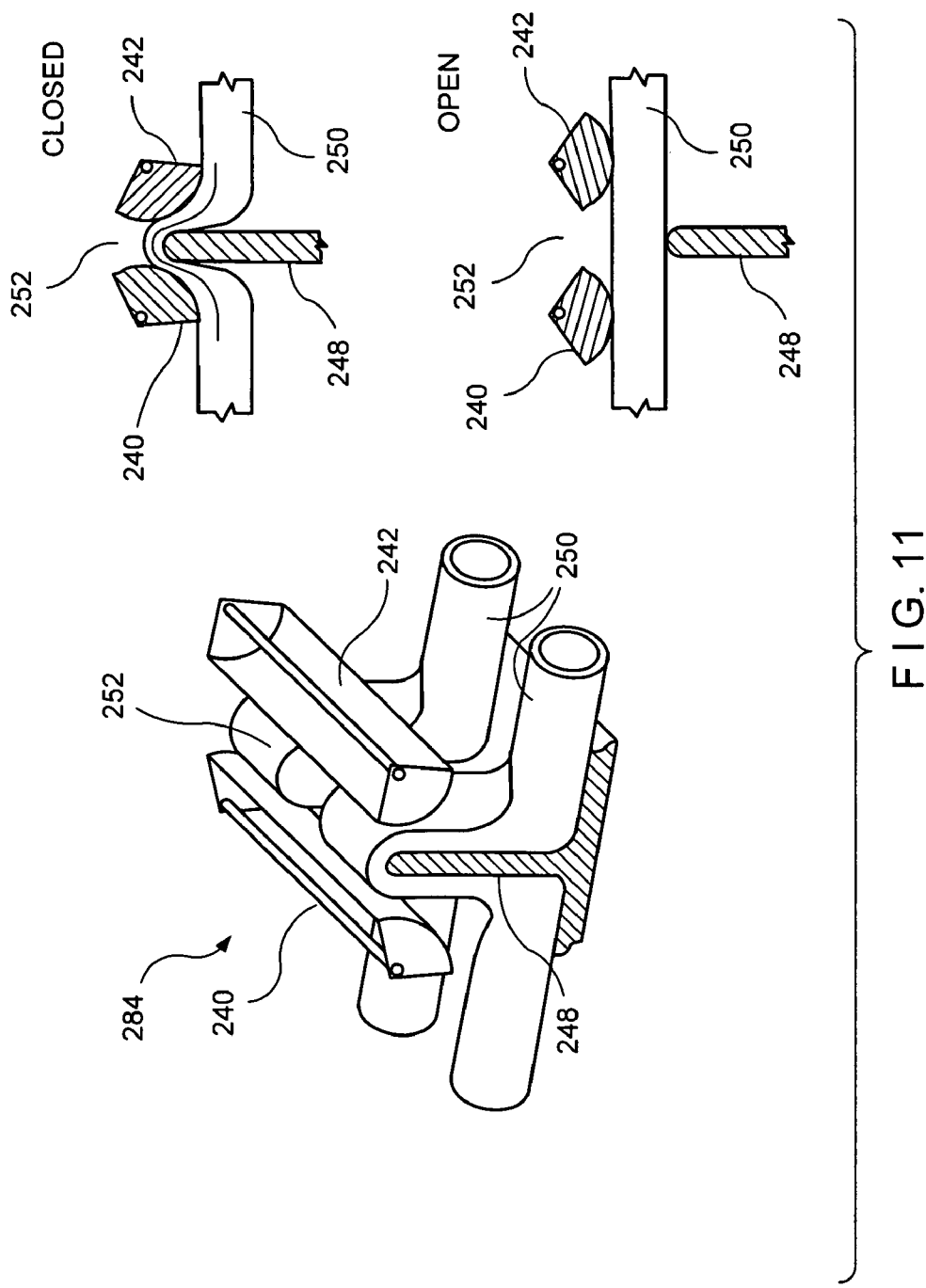
FIG. 11 is a perspective view of a second alternate crimp member for a third embodiment of the pinch valve of this invention with multiple flexible tubings set within the pinch valve.

The pinch valve 20 of this invention is a hybrid design in that it employs arc or arc-like segments and biasing transverse blade pinch elements in combination with each other. A schematic representation of this effect is shown in FIGS. 2 and 3. During the normally closed portion of the operating cycle, a pair of flexible, arc segments 40 and 42, described in detail hereinbelow, are forced into a flexed condition. In this condition, arc segments 40 and 42 exert tube-constricting forces 44 and 46. These forces combine with the biasing means or spring 36 which drives the transverse blade or pinch member 48 into the flexible tubing or conduit 50 thereby crimping the tubing 50 in the throat 52 formed by the flexed segments 40 and 42. The biasing force 54 urges the flexible tubing 50 and the pinch member 48 into the throat 52, which action also flexes segments 40 and 42. The use of flexible arc segments 40 and 42, adds mechanical advantage to the pinch vale and thereby minimizes the force required to bend the tubing 50 concomitantly therewith the construct reduces the surface friction of the tubing 50 against the arc segments 40 and 42. As shown in FIG. 11, the pinch valve 20 is designed to house either a single flexible tubing 50 or multiple flexible tubings 50. When multiple flexible tubings 50 are harnessed together, the size of the pinch member 48 and throat 52 correspond to the width of the combined flexible tubings 50 when collapsed to flat and, if any, harness separators (not shown).

Figure 10:
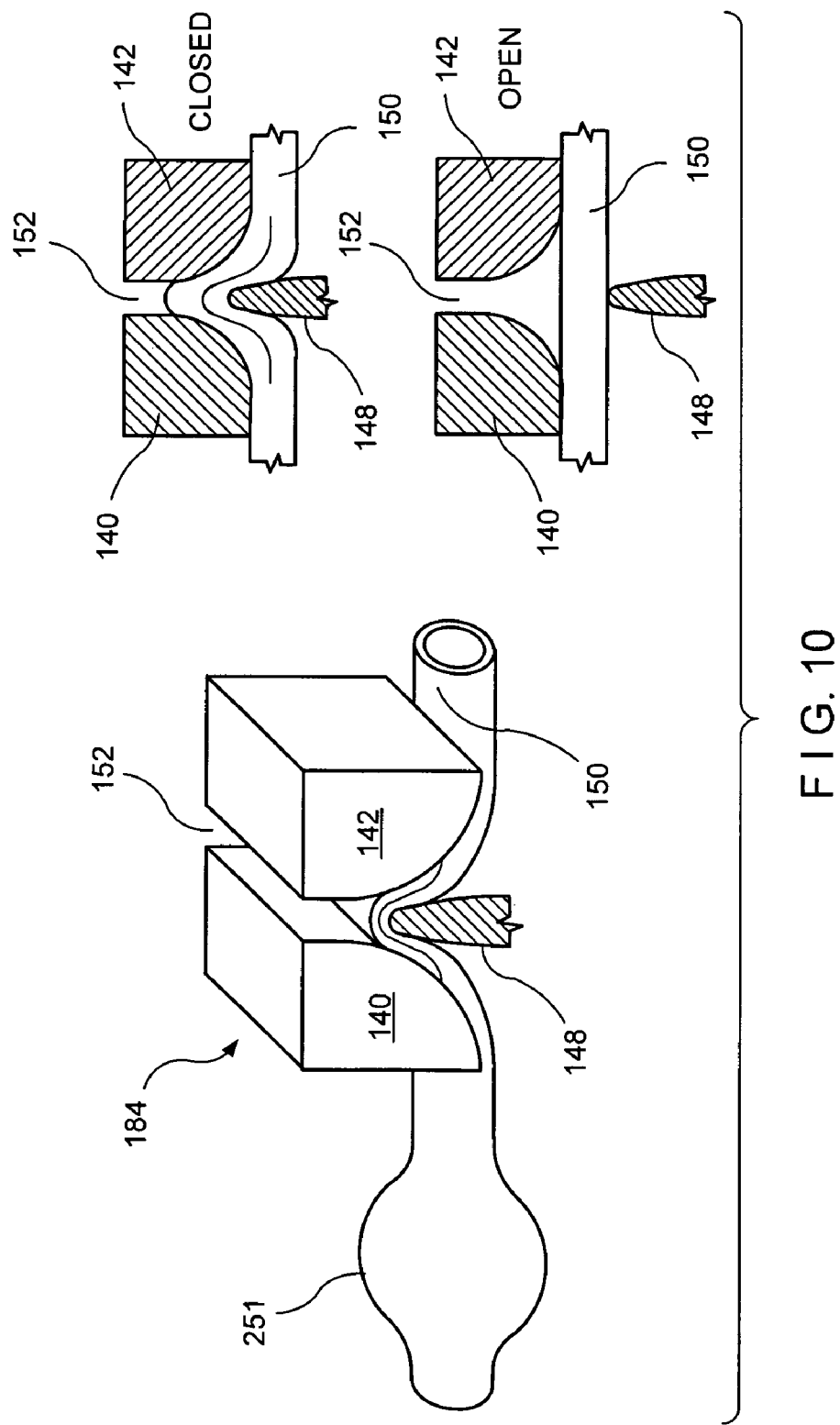
FIG. 10 is a perspective view of a first alternate crimp member for a second embodiment of the pinch valve of this invention showing the bladder adjacent to the flexible tubing set within the transverse channel in a closed position.

The present invention is designed to work alone or in concert with a self-contained fluid source. One application is in connection with a reservoir such as a bladder. The self-contained fluid source or bladder (as shown in FIG. 10 as 251) is formed by filling the tubing 50, with fluid while the pinch valve 20 is in the closed position. The flexible tubing is expanded to form a bladder 251. Alternatively, a separate bladder constructed of a material of sufficient integrity to withstand pressures of up to approximately 40 psi is connected and secured to the tubing 50 providing an air and fluid tight seal. The bladder 251 acts as a storage reservoir and provides control over the pressure of the fluid that is released into the tubing 50 and through the pinch valve 20. The present pinch valve 20 with the manual actuator 38 operates under pressures as high as approximately 40 psi with appropriate tubing.

When the bladder 251 is a separate construct from the tubing, it is filled either prior to connection to the tubing 50 or contains a separate valve or access area for connection to the fluid source (not shown). When the bladder 251 is formed through the expansion of the tubing 50, the tubing end (not shown) set opposite the pinch valve 20 is connected to a fluid source (not shown) and expanded, while the pinch valve 20 is set in the closed position, by the force of the entering fluid. In general, liquids such as water from a public source are delivered at a rate of 90 psi. Through the use of the tubing 50 as a bladder 251, the bladder 251 controls the fluid rate of delivery, lowering the rate of delivery to approximately 40 psi, a rate in which the pinch valve 20 is operable through the use of only manual force.

The bladder 251 and tubing 50 act as a throttle enabling the use of manual force to control the fluid flow entering the system at rates up to approximately 40 psi. The bladder (shown in FIG. 10 as 251) absorbs the differential between the source of the fluid and the pinch valve 20. The self-contained nature of the present invention has many industrial uses including, but not limited to, hospital, assisted care facilities, laboratory, or other industries where the delivery of contaminate-free fluids is required.

Referring now to FIGS. 4 through 7 the outer housing 22, the transverse pinch member 48, and spring 36 are further described. The transverse pinch member 48, the side view of which is shown in FIG. 5 and the front view is shown in FIG. 4, is positioned, when assembled, within outer housing 22 and is mounted therein for reciprocal movement between an open position permitting fluid flow through flexible tubing 50 and a close position preventing fluid flow.

As shown in this preferred embodiment, the transverse pinch member 48 is constructed as a cage or an open box-like frame with no top or bottom, but with four side walls 56, 58, 60, and 62. An opening 64 extends through pinch member 48 and is adapted to receive flexible tubing 50 therethrough. On the interior of the box-like structure and medial side wall 62, a blade member 66 spans between side walls 56 and 58. The side elevation thereof is seen in FIG. 5 wherein side wall 56 is broken away. The blade member 66 has a central plane substantially normal to the longitudinal axis of the flexible tubing 50 (when the valve is in the open position). Disposed on the exterior of wall 62 is a spring-retaining fitting 68 for spring 36. Disposed on the exterior of wall 60 is an actuator-receiving stem 70 for actuator 38.

The outer housing 22, FIGS. 6 and 7, is constructed similar to transverse pinch member 48 in that the housing 22 is also an open box-like frame with no top or bottom, but with four side walls 72, 74, 76 and 78. An opening 80 extends through housing 22 and is adapted to receive therewithin the transverse pinch member. The outer housing 22 is dimensioned so that when the transverse pinch member is assembled therein side walls 56 and 58 slidingly engage walls 72 and 74 and openings 64 and 80 align with one another enabling the tubing to pass therethrough and facilitating the reciprocal movement of the pinch member 48. Disposed on the interior of wall 78 is a spring-retaining fitting 82 for spring 36.

Coil spring 36 is disposed in pinch valve 20 between the spring-retaining fitting 68 of pinch member 48 on the exterior of wall 62 and the spring-retaining fitting 82 of outer housing 22 on the interior of wall 78. The spring strength is selected for the specific application. The specification thereof turns on the fluid pressure anticipated and the actuator pressure desired for initiating fluid flow. The actuator pressure needs to be ergonomically suited to the marketplace for the product.

All of the above-described details occur on one side of the flexible tubing 50 which for descriptive purposes is considered the spring side. On the other side—considered the actuator side, a tube-constricting structure 84, which includes flexible segments 40 and 42, is disposed. The construction of a restrictive channel or throat into which the blade member pushes the flexible tubing is the subject of design variations forming the basis for the various configurations expressed herein as separate embodiments. The best mode practice shown in the first embodiment has hinged segments which, when flexed, form the receiving throat. Other embodiments show a static, but resilient throat, and yet another, an inflexible (rigid) throat that collapses when the valve is open.

Figure 8:
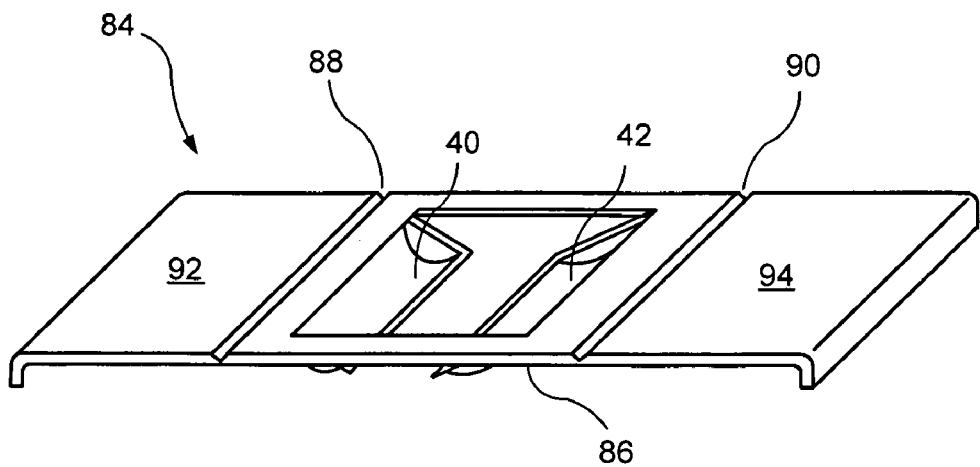
FIG. 8 is a perspective view of the crimp member of the pinch valve of this invention shown prior to assembly thereof.
Figure 9:
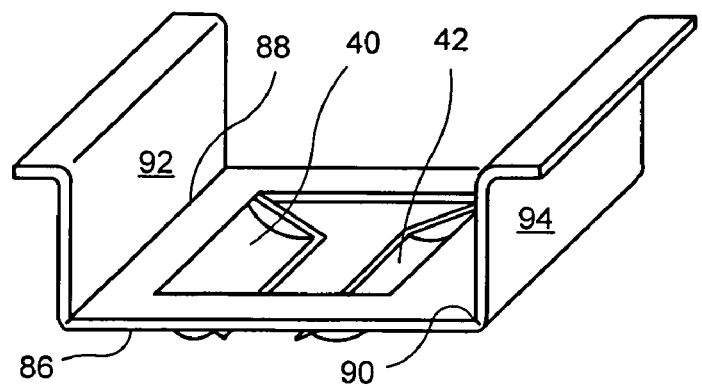
FIG. 9 is a perspective view of the crimp member of FIG. 8, but shown in an as assembled configuration.

Referring now to FIGS. 1, 8 and 9, the tube-constricting structure or crimp member 84 is shown in further detail. The crimp member 84 is formed from an elongated rectangular body 86 that is insertable into the housing 22 through opening 80. At both ends of body 86, the crimp member 84 has perfect hinges 88 and 90, enabling end portions 92 and 94 to rest against the exterior of outer housing 22 from the opening 80 to side wall 76. Intermediate end portions 92 and 94 are flexible segments 40 and 42 hingedly attached to rectangular body 86 and in the relaxed, unflexed condition depending from body 86 in a direction opposite end portions 92 and 94.

Upon completion of assembly, the pinch valve 20 is normally closed and does not permit fluid flow through flexible tubing 50. In this condition, flexible tubing 50 has blade member 66 urged thereagainst and, in turn, flexes segments 40 and 42 forming a throat 52 therebetween.

Referring now to FIG. 10 a perspective view of an alternate tube-constricting member 184 for a second embodiment is shown. Here the transverse channel or receiving throat 152 is a static, inflexible shell 140 and 142 that is resiliently mounted. Upon applying pressure to pinch member 148 (noting that the balance of the components for the second embodiment are the same as the first), the flexible tubing 150 is crimped within the preshaped throat. When the pushbutton is actuated the flexible tubing is released from the transverse channel 152 and fluid flow is initiated.

Referring now to FIG. 11 a perspective view of an alternate tube-constricting member 284 for a third embodiment is shown. Here the transverse channel or receiving throat 252 formed by hinged, inflexible arcuate members 240 and 242 that is preloaded to the valve open position. Upon applying pressure to the pinch member 248 (here again, the balance of the components for the third embodiment are the same as the first), the flexible tubing 250 (shown with multiple flexible tubings) crimped within the throat formed by the hinged arcuate members and the pinch valve crimps the tubing. When the pushbutton is actuated, the flexible tubing 50 is urged from the throat 252 by the hinge preload and the overcoming of the spring bias. To be sufficiently restrictive the throat 252 is dimensioned to be less than the width of the blade 248 plus four times tubing wall thickness.

FIGS. 12 and 13 show the operative positions of the pinch valve of the first embodiment of this invention. Here FIG. 12 shows the pinch valve 20 in the normally closed condition and FIG. 13 shows the pinch valve operated to the open condition. In the normally closed condition spring 36 is extended urging transverse pinch member 48 to crimp the flexible tubing 50 and urge the tubing into the throat 52. In doing so, the tubing 50 flexes segments 40 and 42 causing the arc segments to press against tubing 50. In this condition the pushbutton 38 is fully extended. The use of flexible arc segments 40 and 42, minimizes the force required to bend the tubing 50 by reducing the surface friction of the tubing 50 against the arc segments 40 and 42.

In moving the pinch valve 20 to the open condition, pushbutton 38 is fully depressed. With light manual pressure (9 to 15 lbs) the cage-like structure of the pinch member 48 slides within the housing 22 toward the spring end thereof. As spring 36 compresses, arcuate segments 40 and 42 return to a relaxed condition as best seen in FIG. 9. As the segments 40 and 42 relax, the flexible tubing 50 is released and is gently pushed from throat 52. The flexible tubing 50 becomes and open conduit and fluid flow is initiated. Fluid flow continues so long as the pushbutton remains depressed.

Figure 15:
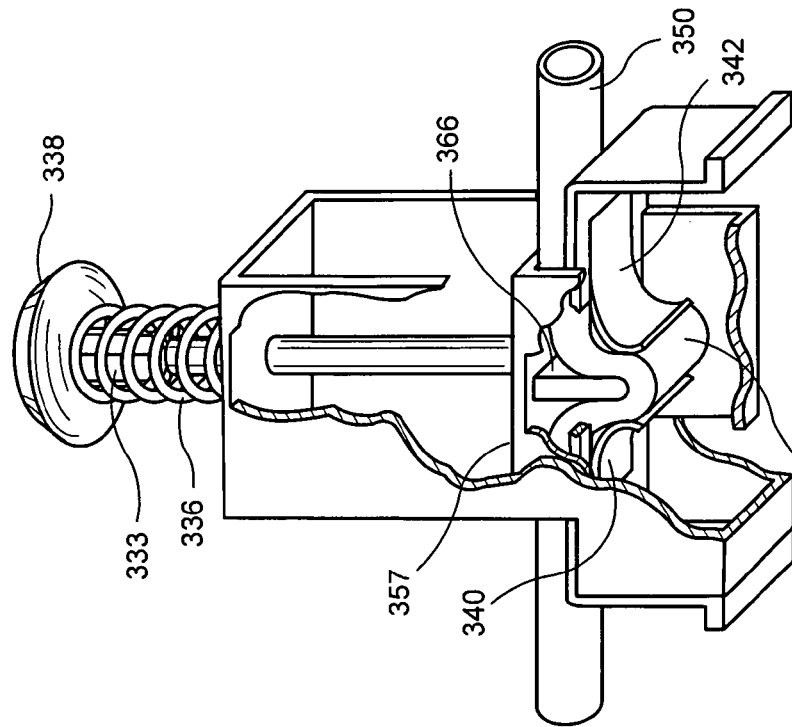
FIG. 15 is a perspective view showing the pinch valve of FIG. 14 operated to the closed condition.
Figure 14:
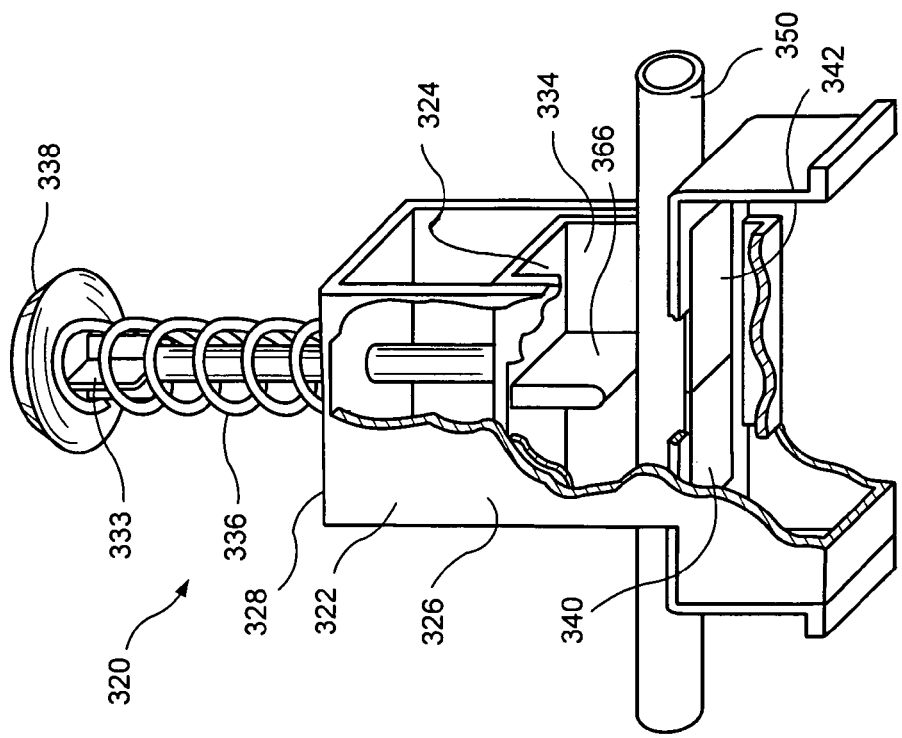
FIG. 14 is a cutaway perspective view of a fourth embodiment of the pinch valve of this invention in the normally open position.

Referring now to FIGS. 14 and 15, a cutaway perspective view of an alternate pinch valve 320 for a fourth embodiment is shown. Here the pinch valve 320 is constructed with an outer housing 322 with side walls 324 and 326 and a base 328. The side walls 324 and 326 each have mounting and locking tabs (not shown) which are used to secure the pinch valve 320 into a panel (not shown). The outer housing or valve body 322 of pinch valve 320 is further constructed with an aperture or opening 334 therethrough, which aperture 334 is provided to accommodate one or more flexible tubings for the conduct of fluid flow. A spring housing 333 is affixed to the pinch valve 320 to support the spring 336. The pinch valve 320 of this invention is a normally open valve and is maintained in such condition by the spring or biasing means 336. To close the pinch valve 320, the force of the biasing means 336 is overcome by the manual operation of the actuator or pushbutton 338 which is affixed to the spring 336. Once the valve 320 is closed, the actuator 338 is held in place to maintain closure.

The pinch valve 320 of this invention is a hybrid design in that it employs arc or arc-like segments and biasing transverse blade pinch elements in combination with each other. A schematic representation of this effect is shown in FIGS. 14 and 15. During the normally open portion of the operating cycle, a pair of flexible, arc segments 340 and 342, described in detail hereinbelow, are set in a relaxed position. When the pinch valve 320 is pushed into the closed position, the arc segments 340 and 342 are forced into a flexed condition. In this condition, arc segments 340 and 342 exert tube-constricting forces. These forces combine with the biasing means or spring 336 which drives the transverse blade or pinch member 366 into the flexible tubing or conduit 350 thereby crimping the tubing 350 in the throat 352 formed by the flexed arc segments 340 and 342. The biasing force urges the flexible tubing 350 and the pinch member 366 into the throat 352, which action also flexes arc segments 340 and 342. The use of flexible arc segments 340 and 342, minimizes the force required to bend the tubing 350 by reducing the surface friction of the tubing 350 against the arc segments 340 and 342. As shown in FIG. 11, the pinch valve 320 is designed to house either a single flexible tubing 350 or multiple flexible tubings 350 (as shown in FIG. 11). In order to house multiple flexible tubings 350, the size of the pinch member 366 and throat 352 correspond to the width of the combined flexible tubings 350.

The present invention is designed to work alone or in concert with a self-contained fluid source. The self-contained fluid source or bladder (as shown in FIG. 10 as 251) is formed by filling the tubing 350, with fluid while the pinch valve 320 is in the closed position. The flexible tubing is expanded to form a bladder 251. Alternatively, a separate bladder constructed of a material of sufficient integrity to withstand pressures of up to approximately 40 psi (not shown) is connected and secured to the tubing 350 providing an air and fluid tight seal. The bladder 251 acts as a storage reservoir and provides control over the pressure of the fluid that is released into the tubing 350 and through the pinch valve 320. The present pinch valve 320 with the manual actuator 338 operates under pressures as high as approximately 40 psi.

When the bladder 251 is a separate construct from the tubing it is filled either prior to connection to the tubing 350 or contains a separate valve or access area for connection to the fluid source (not shown). When the bladder 251 is formed through the expansion of the tubing 350, the tubing end (not shown) set opposite the pinch valve 320 is connected to a fluid source (not shown) and expanded, while the pinch valve 320 is set in the closed position, by the force of the entering fluid. In general, fluids such as water from a public source are delivered at a rate of 90 psi. Through the use of the tubing 350 as a bladder 251, the bladder 251 controls the fluid rate of delivery, lowering the rate of delivery to approximately 40 psi, a rate in which the pinch valve 320 is operable through the use of only manual force.

The bladder 251 and tubing 350 act as a throttle enabling the use of manual force to control the flow of fluid entering the system at rates up to approximately 40 psi. The bladder 251 absorbs the differential between the source of the fluid and the pinch valve 320. The self-contained nature of the present invention has many industry uses including, but not limited to, hospital, laboratory or other industries where the control of contamination is required.

The pinch blade 366 is positioned, when assembled, within outer housing 322 and is mounted therein for reciprocal movement between an open position permitting fluid flow through flexible tubing 350 and a close position preventing fluid flow. The pinch blade 366 is constructed on a frame 357 that is secured to the actuator 338. An opening extends through the outer housing 322 and is adapted to receive one or more flexible tubings 350 therethrough. When in the open position, the arc segments 340 and 342 are in a relaxed position and secure the flexible tubing 350 within the outer housing 322. The blade member 366 has a central plane substantially normal to the longitudinal axis of the flexible tubing 350 (when the valve is in the open position).

Coil spring 336 is disposed in pinch valve 320 between the actuator 338 and the frame 337. The actuator 338 is compressible to at least the length of the outer diameter of the tubing 350 to ensure that the tubing 350 is fully inserted into the throat 352. The spring strength is selected for the specific application. The specification thereof turns on the fluid pressure anticipated and the actuator pressure desired for initiating fluid flow. The actuator pressure needs to be ergonomically suited to the marketplace for the product. The construction of a restrictive channel or throat into which the blade member pushes the flexible tubing is the subject of design variations forming the basis for the various configurations expressed herein as separate embodiments. The best mode practice has hinged arc segments which, when flexed, form the receiving throat.

Upon completion of assembly, the pinch valve 320 is normally open, permitting fluid flow through flexible tubing 350. FIGS. 14 and 15 show the operative positions of the pinch valve of the first embodiment of this invention. Here FIG. 14 shows the pinch valve 320 in the normally open condition and FIG. 15 shows the pinch valve operated to the closed condition. In the closed condition, spring 336 is compressed urging the blade member 366 to crimp the flexible tubing 350 and urge the tubing into the throat 352. In doing so, the tubing 350 flexes arc segments 340 and 342 causing the arc segments to press against tubing 350. In this condition the pushbutton 338 is compressed. With light manual pressure (9 to 15 lbs) the blade member 366 is urged into the throat 352. The use of flexible arc segments 340 and 342, minimizes the force required to bend the tubing 350 by reducing the surface friction of the tubing 350 against the arc segments 340 and 342.

In moving the pinch valve 320 to the open condition, pushbutton 338 is in a relaxed state. As the segments 340 and 342 relax, the flexible tubing 350 is released and is gently removed from the throat 352. The flexible tubing 350 becomes and open conduit and fluid flow is initiated. Fluid flow continues so long as the pushbutton remains relaxed.

While certain novel features of this invention have been shown and described and are pointed out in the claims annexed hereto, the invention is not intended to be limited to the details put forth above, since it is understood that various omissions, modifications, substitutions and changes in the forms and details of the device illustrated and in its operation can be made by those skilled in the art without departing from the spirit of the present invention.

What is claimed is:

1. A pinch valve of the type having flexible tubing extending through a valve body, said flexible tubing having a longitudinal axis and forming a conduit for fluid flow therethrough, said pinch valve comprising:
   a frame adapted to surround said flexible tubing;
   a pair of tube-constricting segments disposed on said frame on one side of said flexible tubing, said pair of tube-constricting segments resiliently mounted to operate between a relaxed condition and a flexed condition, and when in the flexed condition, forming a variable channel therebetween, said channel transverse to said longitudinal axis of said flexible tubing;
   a blade member disposed adjacent said flexible tubing on the side opposite said tube-constricting segments and extending transversely across said frame, said blade member reciprocally positionable between an open position permitting fluid flow and a closed position closing said flexible tubing within said channel and preventing fluid flow.

2. A pinch valve as described in claim 1 wherein said pair of said tube-constricting means, when in said flexed condition, are opposed arcuate surfaces having parallel axes.

3. A pinch valve as described in claim 1 further comprising a biasing means for urging said blade member into said channel for normally closed operation.

4. A pinch valve as described in claim 3 further comprising actuator means for overcoming said biasing means and moving said tube-constricting means to a relaxed condition thereby permitting fluid flow through said flexible tubing.

5. A pinch valve as described in claim 4 wherein said actuator means is a pushbutton and said flexible tubing remains open only while said pushbutton is depressed.

6. A pinch valve as described in claim 5 wherein said biasing means, upon said pushbutton being released moves said tube-constricting means from a relaxed condition to a flexed position thereby returning said pinch valve to a normally closed condition.

7. A pinch valve as described in claim 1 further comprising a biasing means for urging said blade member away from said channel for normally open operation.

8. A pinch valve as described in claim 7 wherein said biasing means, upon said pushbutton being released moves said tube-constricting means from a flexed position to a relaxed condition thereby returning said pinch valve to a normally opened condition.

9. A pinch valve as described in claim 8 wherein said pushbutton is operable against fluids at high pressure with a predetermined manually applied force.

10. A pinch valve for restricting flow of fluid stored under high pressure, said pinch valve comprising:
- one or more flexible tubes having longitudinal axes and forming a conduit for high-pressure fluid flow;
- a base;
- an open framework arising from said base having a front, a back, and a right- and a left-side adapted for threading said one or more flexible tubes through the medial portion thereof;
- a blade member disposed between said base and said one or more flexible tubes for reciprocal movement against and away from said one or more flexible tubes thereby respectively preventing and permitting fluid flow, said blade member mounted transverse the longitudinal axes thereof;
- a resilient restrictive channel formed from opposed arcuate surfaces having a wide mouth and a narrow throat disposed in said open framework on the side of said one or more flexible tubes opposite said blade member, said resilient restrictive channel receiving and closing said one or more flexible tubes and said receiving blade member therewithin; and,
- a biasing member for urging said blade member into said restrictive channel.

11. A pinch valve as described in claim 9 wherein said biasing member is a spring.

12. A pinch valve as described in claim 10 wherein said opposed arcuate members are fixed and said pinch valve further comprises:
- an actuator for closing said restrictive channel.

13. A pinch valve for restricting flow of fluid stored under high pressure, said pinch valve comprising:
- a flexible tubing;
- a valve body having an opening therein for permitting the passage of said flexible tubing therethrough;
- a pinch arm movably attached to said valve body and engageable to one side of said flexible tubing passing through said opening, said pinch arm being movable between an open position at which said flexible tubing is not compressed by the pinch arm and a closed position at which said flexible tubing is collapsed by compression thereof;
- a restrictive throat formed from two resiliently mounted arcuate members mounted on said valve body on the side of said flexible tubing opposite said pinch arm and oriented for accommodating therewithin, when said pinch arm is at said closed position, said pinch arm and said flexible tubing in a collapsed condition said restrictive throat opening is less than four times the flexible tubing thickness plus the pinch arm thickness; and,
- a bladder adjacent to said flexible tubing configured to store said fluid when said pinch arm is at said closed position.

14. A pinch valve as described in claim 13 wherein said bladder is formed from said flexible tubing.

15. A pinch valve as described in claim 13 further comprising a biasing means for urging said pinch arm into restrictive throat.

16. A pinch valve as described in claim 15 wherein said biasing means is a spring.

17. A pinch valve as described in claim 13 further comprising a manual actuator operative, when depressed, to change the restrictive throat opening and to oppose the force of said biasing means thereby initiating flow of said fluid through said flexible tubing.

18. A pinch valve as described in claim 17 wherein said pushbutton is operable against fluids at high pressure with a predetermined manually applied force.

19. A pinch valve as described in claim 18 wherein said manually applied force counters said spring driving said pinch arm.

20. A pinch valve as described in claim 19 wherein the material of said restrictive throat is compatible with the material of said flexible tubing in that during operation low friction therebetween permits one to roll over the other.

* * * * *